June 23, 1925.  
F. G. MATSON  
STOVE OR OVEN  
Filed March 23, 1923  
1,543,220
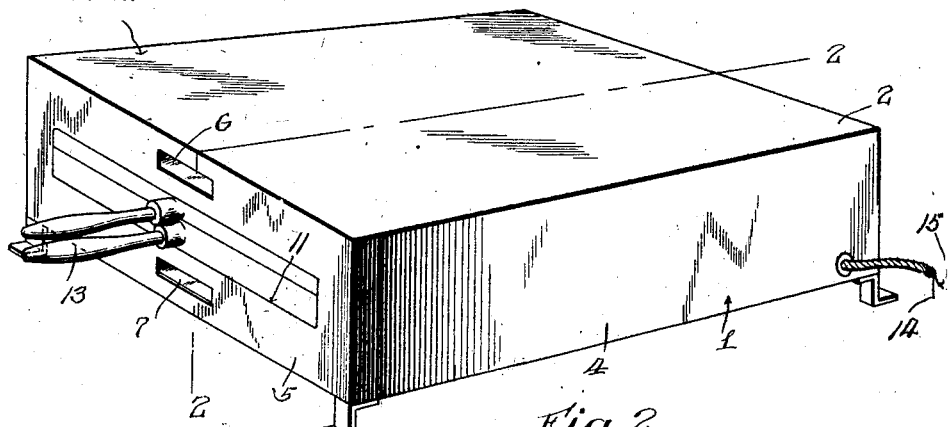
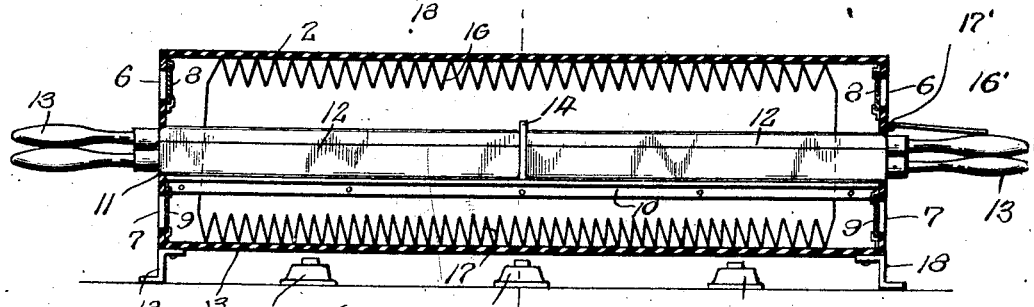
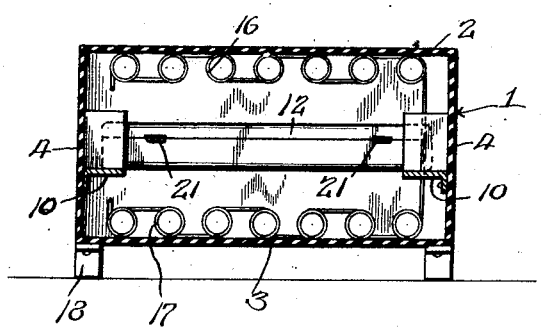
Inventor,  
Francis G. Matson Patented June 23, 1925.

1,543,220

UNITED STATES PATENT OFFICE.

FRANCIS G. MATSON, OF WASHINGTON, DISTRICT OF COLUMBIA.

STOVE OR OVEN.

Application filed March 23, 1923. Serial No. 627,172.

*To all whom it may concern:*

Be it known that FRANCIS G. MATSON, a citizen of the United States of America, residing at Washington, District of Columbia, has invented certain new and useful Improvements in Stoves or Ovens, of which the following is a specification.

The object of my invention is to provide a simply constructed baking stove or oven which will permit of baking molds being inserted in and withdrawn from either end thereof.

Other and further objects and advantages of the invention will be in part obvious and in part described as the specification is proceeded with.

In the accompanying drawings:

Figure 1 is a perspective view of my invention;

Figure 2 is a section on the line 2—2 of Figure 1; and

Figure 3 is a section on the line 3—3 of Figure 2.

Referring more particularly to the drawing, 1 denotes the oven comprising top and bottom walls 2 and 3, side walls 4, and end walls 5, suitably supporting legs 18, being provided at the four corners.

The end walls 5, are provided with upper and lower openings 6 and 7 covered respectively by transparent plates 8 and 9 of glass or other suitable material for an obvious purpose.

Secured to the side walls 4, on the inside thereof are a pair of oppositely disposed angle iron ledges or tracks 10, flush with the lower edge of central openings 11, formed in the end walls 5. The purpose of these ledges is to slidingly support baking molds 12, which contain the article to be cooked (not shown) and which molds are inserted through the central openings 11, handles 13, being provided to facilitate handling the molds. A bar 14, spanning the ledges 10, intermediate the ends of the latter serves as a stop for the molds as clearly indicated in Figure 2 of the drawings.

The molds may be of any suitable construction, preferably comprising top and bottom members 19, and 20 respectively, hingedly connected together as at 21.

The stove or oven is preferably heated by electricity supplied through the wires 14' and 15 from any suitable source of current (not shown) to the heating coils 16 and 17. These coils are arranged at the top and bottom of the stove or oven and above and below the opening 11, respectively so that the maximum amount of heat therefrom will be communicated to the top and bottom of the molds 12.

In use the operator inserts one of the molds 12, into the stove or oven until it contacts with the stop 14. While the baking operation is going on he moves to the other side of the stove or oven and after inserting another mold returns and removes the first mold, this cycle of operation being more or less continuous.

Where the operator employs but one mold the opening 11, at one side of the stove or oven can be closed by the door 16', hinged as at 17'' to one of the end walls 5.

In Figure 2 I have illustrated oil or gaseous fuel burners 22, as a means for heating the stove or oven where electric current is not available.

Having thus described my invention what I claim as my invention is:

A stove comprising side, end, top and bottom walls, heating elements arranged in the stove adjacent said top and bottom walls, the end walls being provided with transverse aligned openings intermediate their top and bottom edges, ledges secured to the side walls having their top faces flush with the lower edge of said openings said ledges adapted to slidably receive a baking mold, a bar spanning the ledges for limiting the inward movement of the molds on the ledges, and a hinged cover for closing one of the aligned openings when only one baking mold is being used.

In testimony whereof I affix my signature in presence of two witnesses.

FRANCIS G. MATSON.

Witnesses:
 MELVIN D. HILDRETH,
 GREY MASON.